No. 720,110. PATENTED FEB. 10, 1903.
W. CARTWRIGHT.
MOUTHPIECE FOR SPEAKING TUBES.
APPLICATION FILED JULY 14, 1902.
NO MODEL.
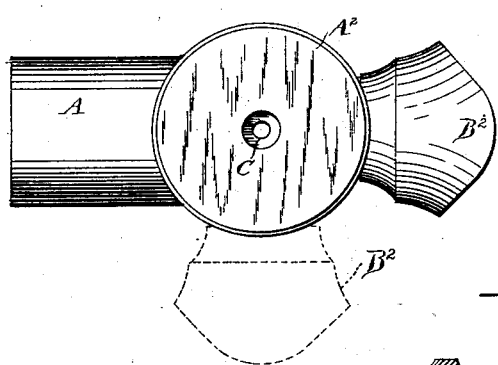
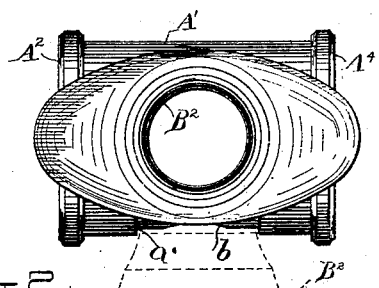
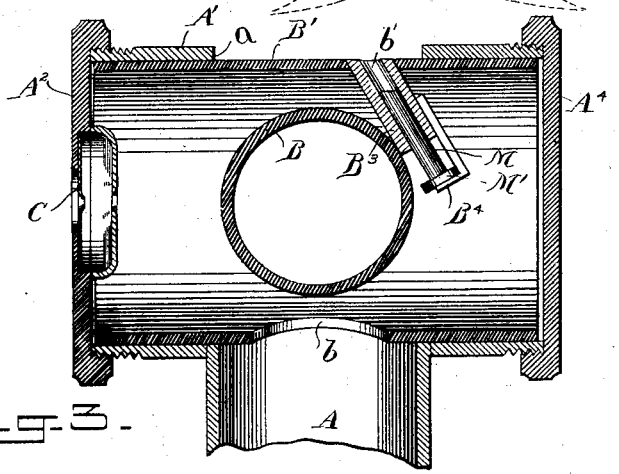
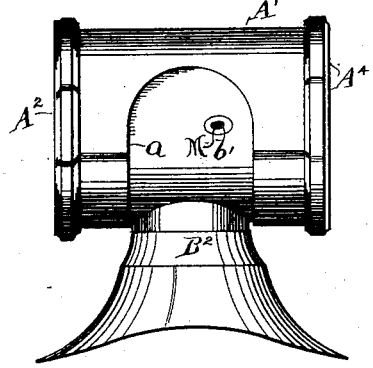
WITNESSES:
Marc A. Guigou.
J. B. Clarice.
INVENTOR
William Cartwright
BY
Thomas Drew Stetson
ATTORNEY

UNITED STATES PATENT OFFICE.

WILLIAM CARTWRIGHT, OF PHILADELPHIA, PENNSYLVANIA, ASSIGNOR TO CHARLES CORY & SONS, OF NEW YORK, N. Y., A FIRM.

MOUTHPIECE FOR SPEAKING-TUBES.

SPECIFICATION forming part of Letters Patent No. 720,110, dated February 10, 1903.

Application filed July 14, 1902. Serial No. 115,403. (No model.)

*To all whom it may concern:*

Be it known that I, WILLIAM CARTWRIGHT, a citizen of the United States, residing in the city and county of Philadelphia, in the State of Pennsylvania, have invented a certain new and Improved Mouthpiece for Speaking-Tubes, of which the following is a specification.

My improvement is adapted more particularly for use on ships; but it may be of advantage in manufactories and generally in any situations where it is required to communicate with several distant stations and to receive from the same, and it is necessary to distinguish not only in sending which station the communication is to go to, but also in receiving to recognize when a whistle is sounded which is the station from which it comes, so as to know which to give attention to. I have devised simple means for indicating to the eye which mouthpiece requires attention. I have also discovered an arrangement by which the indicator moves out horizontally and will remain out for any period, so long as the mouthpiece is not turned up into the position for use; but such turning throws the indicator into such position that it retreats and without requiring any attention from the operator automatically sets itself ready to receive the next signal.

The following is a description of what I consider the best means of carrying out the invention.

The accompanying drawings form a part of this specification.

Figure 1 is a side elevation with the mouthpiece up in position for use. The dotted line shows the condition when the apparatus is out of use. Fig. 2 is a corresponding front view. Fig. 3 is on a larger scale. It is a section on the line 3 3 in Fig. 5. Figs. 4 and 5 are on the same scale as Figs. 1 and 2. Fig. 4 is a front view of the parts when out of use. This shows the indicating device presented to show that a call has been made for the use of this mouthpiece. Fig. 5 is a corresponding side view with the end removed. It shows the indicating device in the interior.

Similar letters of reference indicate corresponding parts in all the figures where they appear.

My mouthpiece will serve alone with the same satisfaction as any of the ordinary styles; but its chief advantages are only available when there are two or more associated. As all may be alike, a description of one will suffice for all.

A is the tube communicating with a distant point.

A' is a transversely-set hollow cylinder having a considerable opening $a$, the function of which will presently appear. One end of the cylinder A' is closed by a cover $A^2$, having a whistle C mounted in it, and the other end is closed by a plain cover $A^4$. A hollow cylinder B' is inclosed within the cylinder A' and adapted to turn therein. A tube B extends diametrically across the cylinder B' and is continued outward at one end, carrying a mouthpiece $B^2$. The aperture $a$ allows the cylinder B' to be turned into such position that the tube B lies level, in which case it is in line with the tube A and forms a free communication with such tube. This is the condition for use, as shown in Fig. 1. The aperture $a$ is so formed and arranged as to allow the cylinder B' to be turned a quarter-revolution to bring the tube B into the vertical position. When this is done, the mouthpiece $B^2$ is entirely isolated from the tube A. This is the condition when out of use. When this obtains and a distant party blows through the tube A, the air cannot escape otherwise and blows strongly through the whistle C, thus calling attention. At any time after the party at this end of the line hears the signal he may step to the instrument and turn the mouthpiece. Then all the parts are ready for service. The indicator retreats by gravity at this stage. At the close of the interview gravity carries the mouthpiece down again and the instrument is again out of condition for use.

A liberal orifice $b$, formed in the tube B' at right angles to the tube B, serves to make a free communication between the general interior of the tube B' and the main tube A when the mouthpiece is in the unused condition. This insures that the blast of air received from the mouth of the distant party shall have free access to the interior of the tube, so as to work the indicating device, to be now described. Another orifice $b'$ serves an important function by indicating to the eye from which of the several distant points a call is received.

$B^3$ is a tube or passage bored in the cylinder $B'$ and open at both ends. An arm $B^4$ constitutes a bent extension arranged as shown.

M is a long easily-fitting piece of metal adapted to play within the cylinder $B^3$. Its inner end carries an enlarged head $M'$, which is adapted to traverse along the arm $B^4$ and to have its inward movement arrested by striking the bent end of the latter and its outward movement arrested by striking the inner end of the cylinder $B^3$. I have shown this device as set at a considerable angle to the axis and esteem such a position favorable; but it is not absolutely essential. The parts are so arranged that when the mouthpiece is out of use the cylinder B lies horizontally, and when a blast of air is received from the mouth of the operator at the other end of the speaking-tube it will move the loose piece M horizontally out until the head $M'$ strikes the inner end of the tube $B^3$. In this position the end of the piece M should present itself and extend out at the hole $b'$. By making this end or the whole of the piece M of a different-colored metal from the cylinder B its presence or absence at the hole $b'$ becomes the more marked. After each use the indicator is left in a level position, gravity exerting no influence. It is certain to maintain its position until a blast of air is received. When this occurs, the indicator is easily moved and caused to protrude, the movement being level. It will remain thus for any period in case the receiving operator is otherwise occupied at first.

It will now be understood that so long as the several mouthpieces arranged side by side are out of use the several holes $b'$ are all empty. When a blast comes through either of the tubes A, it will sound the whistle for that tube and will also blow the piece M for that tube into such position that it becomes plainly visible at the corresponding orifice $b'$. It thus marks which is the mouthpiece which requires attention. The attendant turns up that mouthpiece and is ready instantly to commence and continue a conversation. The act of so turning up the trumpet-mouth $B^2$ for use turns the tube or passage $B^3$ into a position so nearly upright that the loose piece M thereon drops inward by gravity, and when the trumpet-mouth is again turned downward this piece M remains inward and is, as before, ready for the next operation.

Modifications may be made without departing from the principle or sacrificing the advantages of the invention. The tube $B^3$ may serve if considerably shorter than here shown. The angle may be varied within wide limits. The position may be varied. I prefer the inclined position shown, not only because it allows the aperture $b'$ to come clearly into sight near the center line of the aperture $a$ and allows the inner portion to extend entirely clear of the tube B, but also because it causes the indicator to retreat automatically after use is completed and insures that the indicator will remain in sight for any period until the mouthpiece is turned into the position for use. Conforming to these conditions it can be sunk into the tube B or may extend diametrically through it, if preferred in any case.

I claim as my invention—

1. A speaking-tube A having a transverse cylinder $A'$ permanently fixed, the latter with closed ends, and a large aperture $a$, in combination with a turning cylinder $B'$ inclosed in the cylinder $A'$ equipped with a mouthpiece $B^2$ extending out through such aperture and a tight casing B extending across the turning cylinder and with a movable piece M mounted in a passage $b'$ in such turning part arranged to lie horizontally when the device is out of use and to be easily forced out by the pressure of air received from the other end of the line and to be moved inward again by gravity so soon as the device is thrown into the position for use, all substantially as herein specified.

2. A speaking-tube A having a transverse cylinder $A'$ permanently fixed, the latter with closed ends, and a large aperture $a$, in combination with a turning cylinder $B'$ inclosed in the cylinder $A'$ equipped with a mouthpiece $B^2$ extending out through such aperture and a tight casing B extending across the turning cylinder and with a movable piece M mounted in a passage $b'$ in such turning part arranged to lie horizontally when the device is out of use and to be easily forced out by the pressure of air received from the other end of the line and to be moved inward again by gravity so soon as the device is thrown into the position for use, and with a whistle C, all arranged to serve substantially as herein specified.

In testimony that I claim the invention above set forth I affix my signature in presence of two witnesses.

WILLIAM CARTWRIGHT.

Witnesses:
SAML. S. McCLOSKEY,
ELIZABETH McCLOSKEY.